United States Patent [19]

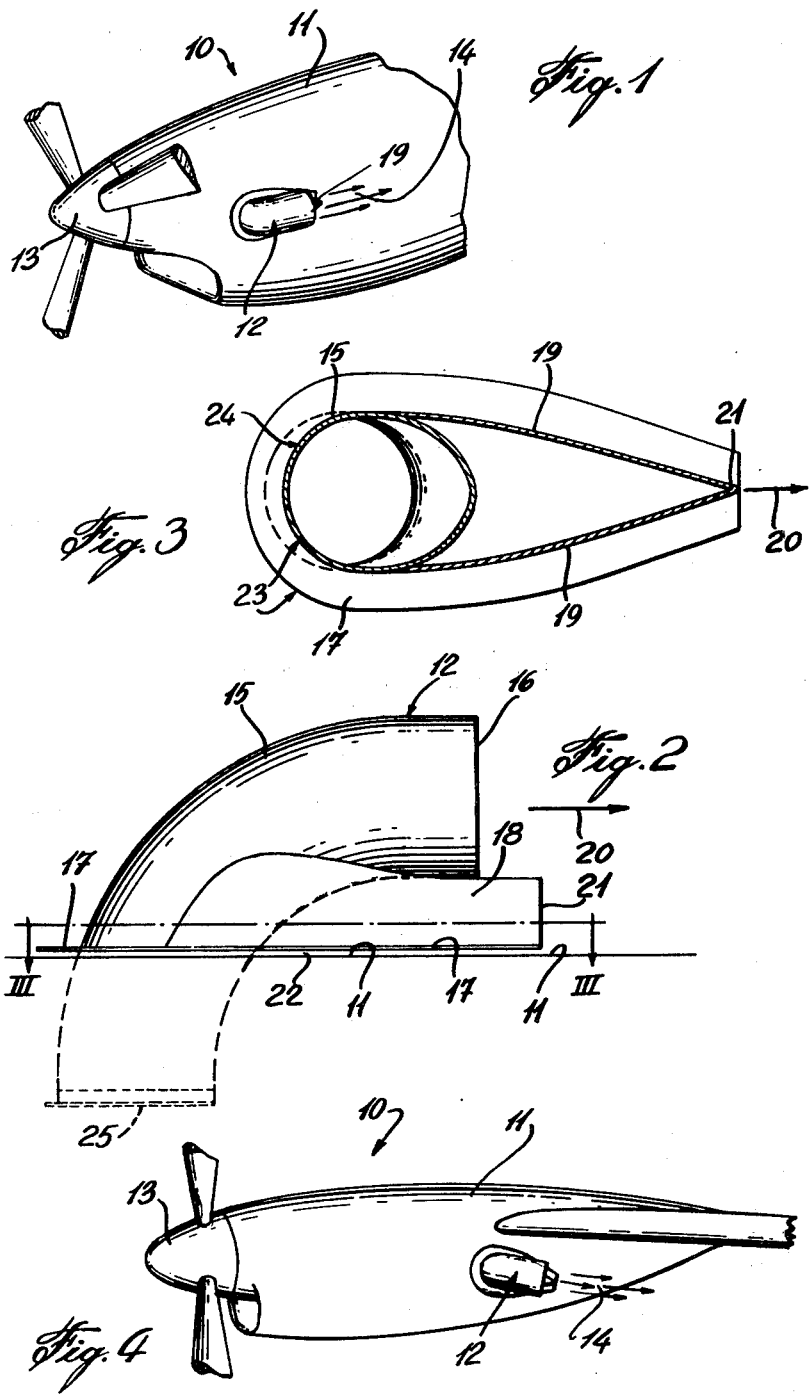

Doig et al.

[11] 4,172,572

[45] Oct. 30, 1979

[54] EXHAUST STUB WITH END PLATE

[75] Inventors: Wilson C. Doig; John J. Sanderson, both of St. Bruno, Canada

[73] Assignee: Pratt & Whitney Aircraft of Canada Ltd., Longueuil, Canada

[21] Appl. No.: 914,220

[22] Filed: Jun. 9, 1978

Related U.S. Application Data

[63] Continuation of Ser. No. 791,942, Apr. 28, 1977, abandoned.

[51] Int. Cl.² .................... B64D 33/04; B64D 29/00
[52] U.S. Cl. ................................................ 244/53 R
[58] Field of Search ................ 244/53 R, 54, 12.5, 244/130

[56] References Cited

U.S. PATENT DOCUMENTS

| | | | |
|---|---|---|---|
| 2,207,242 | 7/1940 | DeSeversky | 244/53 R |
| 3,020,004 | 2/1962 | Blyth et al. | 244/54 |

FOREIGN PATENT DOCUMENTS 530542 12/1940 United Kingdom ................ 244/53 R Primary Examiner—Barry L. Kelmachter
Attorney, Agent, or Firm—Alan Swabey; Robert Mitchell; Guy Houle

[57] ABSTRACT

An exhaust stub for a turbo-prop engine which exits from the aircraft nacelle at a location other than the aft end. A fairing is attached to the exhaust stub to minimize frontal area for a given exhaust stub exit area, but free of the nacelle, because of the requirement for the exhaust stub to move relative to the nacelle. An end plate is secured about the exhaust stub and fairing, substantially parallel to and at close proximity to the nacelle. The end plate effectively improves the performance of the fairing, by eliminating the effect of the gap in the nacelle around the stub and also the gap between the fairing and the nacelle. Improving the performance of the fairing reduces the magnitude of the exhaust duct wake which in turn reduces the momentum definiency in the wake flow; reduces exhaust duct drag; reduces mixing of the exhaust gases into the wake region; and reduces nacelle sooting by exhaust gases.

7 Claims, 4 Drawing Figures

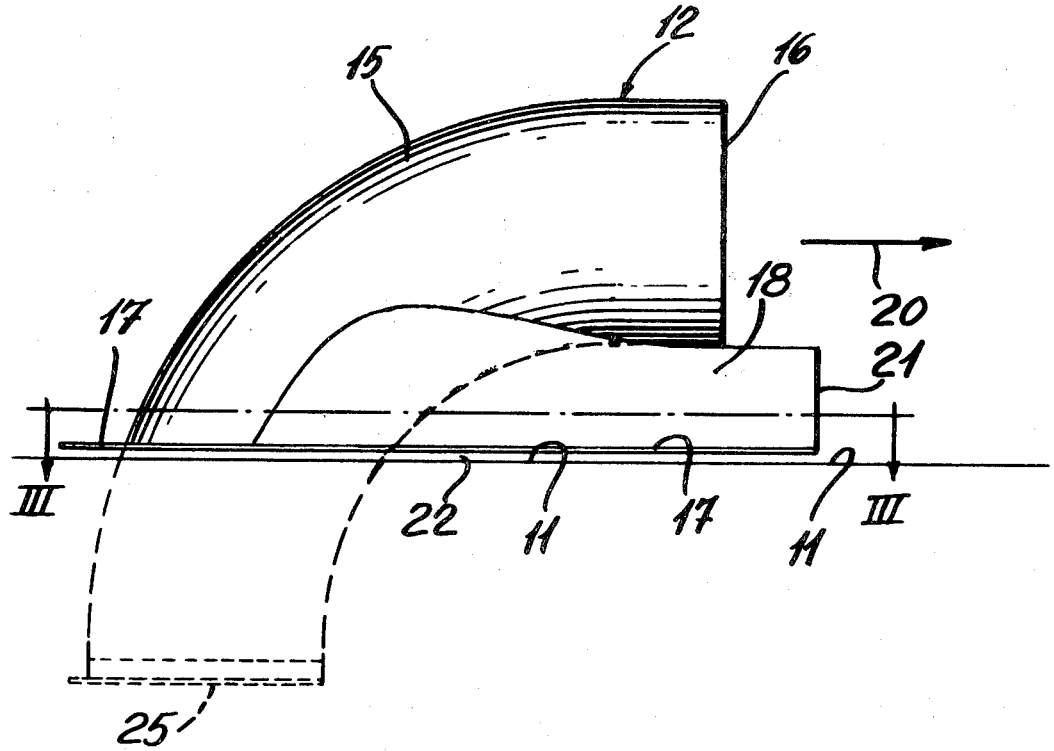

EXHAUST STUB WITH END PLATE

This is a continuation of application Ser. No. 791,942 filed Apr. 28, 1977, now abandoned.

BACKGROUND OF INVENTION (a) Field of Invention

The present invention relates to an improved exhaust stub for use with turbo-prop engines and more particularly, to faired exhaust stub having an end plate to reduce drag and minimize sooting of the nacelle.

(b) Description of Prior Art

The exhaust duct stub, as a result of either a reverse flow type turbo-prop engine or because of nacelle geometry, exits from the nacelle at a location other than at the aft end of the nacelle. The exhaust stub contains an outlet through which exhaust gases are released. When these gases are released into the airstream, they will become entrained in the momentum deficient air behind the stub. This entrainment results in soot deposits on the nacelle. Thus, the nacelle requires periodic cleaning to remove the soot.

A further disadvantage of the engine exhaust stub is that it creates drag.

SUMMARY OF INVENTION

In a gas turbine installation the exhaust stub must be allowed to move relative to the nacelle, because of thermal expansion and non-rigid mounting of the engine. A gap is necessary around the perimeter of the exhaust stub, where the duct exits from the nacelle to accommodate relative displacement between the stub and nacelle. As such, fairings must be attached either to the exhaust stub or to the nacelle with the result that for the former configuration the drag of the stub is substantially reduced and for the latter increased drag is incurred relative to the former due to increased frontal area and by an exhaust area in excess of the stub exit area.

To reduce the adverse effects of these gaps, when the fairing is attached to the exhaust stub, the invention provides an end plate attached to the stub and fairing such that there is only a small gap between the end plate and the nacelle. The end plate is of sufficient width so that the adverse effect of the gap on the diffusion along the fairing is negligible. This results in a substantial reduction in the size of the wake downstream of the duct, which in turn reduces entrainment of exhaust gases into the wake region due to the reduction in momentum deficiency of the wake flow.

It is a feature of the present invention to provide an exhaust stub having a fairing and an end plate whereby substantially reducing sooting and drag.

It is a further feature of the present invention to provide a method of reducing sooting on the nacelle of aircraft equipped with turbo-prop engines.

According to the above features, from a broad aspect, the present invention provides an open-ended exhaust stub for a turbo-prop engine having an exhaust duct with an outlet end, said exhaust stub having an end secured to said outlet end and extending through an engine nacelle, a fairing and an end plate secured about a portion of said stub above said engine nacelle with said end plate being disposed to be spaced substantially parallel to said engine nacelle whereby to produce a small gap between said end plate and said engine nacelle, whereby said end plate substantially improves diffusion which normally occurs on said fairing and thereby reducing the magnitude of the exhaust stub wake and thus substantially reducing sooting of said engine nacelle in a wake region of exhaust flow behind the stub, said fairing and end plate further reducing exhaust stub drag.

According to a further broad aspect, the present invention provides a method of reducing sooting on the nacelle of aircraft equipped with turbo-prop engines having one or more exhaust stubs, comprising an end plate which improves diffusion along the fairing, thus forming a blanket of undisturbed air between exhaust efflux and said nacelle whereby reducing the entrainment of the exhaust gases by the momentum deficient air behind said stub and also reducing stub drag and maximizing stub thrust minus drag.

BRIEF DESCRIPTION OF DRAWINGS

A preferred embodiment of the present invention will now be described with reference to the accompanying drawings in which:

FIG. 1 is a perspective view, partly fragmented, showing a turbo-prop engine mounted on an aircraft and equipped with an exhaust stub;

FIG. 2 is a side view of the exhaust stub shown extending through the nacelle;

FIG. 3 is a section view along sectional lines III—III of FIG. 2; and,

FIG. 4 is a perspective view, partly fragmented, showing a turbo-prop engine mounted on an aircraft and equipped with an exhaust stub exiting at the rear of the engine.

DESCRIPTION OF PREFERRED EMBODIMENTS

Referring now to the drawings, and more particularly to FIGS. 1 and 4, there is shown generally at 10 a turbo-prop engine as mounted on an aircraft. The turbo-prop engine is secured within an engine housing having a nacelle 11 through which an exhaust stub 12, secured at 25 to an outlet end of an exhaust duct (not shown), protrudes for the release of the engine exhaust gases. The exhaust stub 12 protrudes behind the propeller 13. Numeral 14 denotes the sooting area on the nacelle 11 normally caused by exhaust gases released from the exhaust stub 12.

Referring now to FIGS. 2 and 3, there is shown the construction of a full turning stub 12. The exhaust stub 12 consists essentially of an exhaust pipe 15 having an outlet end 16 where exhaust gases are released. A flat end plate 17 is secured about a portion of the pipe 15 and extends in a plane substantially transverse to the pipe 15. The end plate is a flat metal plate shaped to be parallel to the engine nacelle 11.

A fairing 18 fills in the gap between the stub outlet end 16 and the nacelle 11 and the end plate 17 is secured to fairing 18. This fairing 18 consists of opposed walls 19 extending substantially vertically from opposed sides of the exhaust pipe 15 from diametrically opposed points of the pipe 15 and tapers rearwardly towards one another in the direction of the exhaust flow, as demonstrated by arrow 20, to an end point 21 below the outlet end 16.

In use, the end plate 17 is positioned slightly above the surface of the engine nacelle 11 whereby to form a gap 22 therebetween. The end plate 17 is of sufficient width so that the adverse effects of the gap 22 on the diffusion along the fairing 18 is negligible. This results in a substantial reduction in the wake downstream of the stub 12 which in turn reduces the entrainment of exhaust gases, whereby substantially reducing sooting.

As shown more clearly in FIG. 3, the end plate 17 is substantially elongated and extends longitudinally in the direction of the exhaust flow as denoted by arrow 20. The plate also has a rounded contoured front end 23 which is positioned concentrically with respect to the rounded front end 24 of the exhaust stub 12. The configuration of the fairing 18, exhaust pipe 15 and the end plate 17, reduces the drag normally experienced with exhaust stubs without fairings and end plates.

As previously described, FIG. 2 illustrates a full turning stub, that is to say, a pipe discharging axially into the airstream; this maximizes the thrust from the exhaust gases. However, for aesthetic or other reasons the exhaust stub need not be full turning.

Summarizing, it has been found that sooting on the nacelle of aircraft equipped with turbo-prop engines having exhaust stubs can be substantially reduced by ensuring undisturbed flow between the exhaust efflux and the nacelle. As a result of these measures, thrust minus drag is maximized and an airplane speed improvement is obtained.

We claim:

1. An open-ended exhaust stub for a turbo-prop engine having an exhaust duct with an outlet end and a nacelle through which said exhaust stub extends, said exhaust stub having an end secured to said outlet end and extending through said engine nacelle in spaced relation with there being a space therebetween to permit movement of said exhaust stub relative to said nacelle, a fairing and an end plate secured about a portion of said stub with said stub passing through an intermediate part of said end plate, said fairing and said end plate being secured between said stub and said engine nacelle with said end plate being disposed to be spaced substantially parallel to said engine nacelle whereby to produce a gap between said end plate and said engine nacelle, whereby said end plate substantially improves diffusion which normally occurs on said fairing due to the space between said exhaust stub and said nacelle and thereby reducing the magnitude of the exhaust stub wake and thus substantially reducing sooting of said engine nacelle in a wake region of exhaust flow behind the stub, said fairing and end plate further reducing exhaust stub drag.

2. An exhaust stub as claimed in claim 1 wherein said end plate is an elongated plate extending longitudinally in the direction of said exhaust flow, said plate tapering inwardly in said direction of exhaust flow.

3. An exhaust stub as claimed in claim 2 wherein said exhaust stub has a round front end in an area extending through said engine nacelle, said elongated plate having a rounded contoured front end extending concentrically with respect to said exhaust stub rounded front end.

4. An exhaust stub as claimed in claim 2 wherein said fairing is secured between said end plate and said exhaust stub, said fairing consisting of opposed walls extending substantially vertically from opposed sides of said exhaust stub from diametrically opposed points and tapering rearwardly toward one another in said direction of exhaust flow to an end point below an outlet end of said stub.

5. An exhaust stub as claimed in claim 4 wherein said exhaust stub is full turning to discharge axially into external airstream.

6. An exhaust stub as claimed in claim 4 wherein said outlet end of said stub faces rearwardly to discharge outwardly into external airstream.

7. A method of reducing stub drag and sooting on the nacelle of aircraft equipped with turbo-prop engines having a nacelle and at least one exhaust stub extending through the nacelle with a space between each exhaust stub and the nacelle, said method comprising forming a blanket of undisturbed air between exhaust efflux and said nacelle with the blanket extending alongside the space between the nacelle and each exhaust stub whereby reducing the entrainment of the exhaust gases by the momentum deficient air behind each said stub and also maximizing stub thrust minus drag, said blanket of undisturbed air being formed by a fairing and an end plate extending about and secured to a portion of each said stub and extending between said stub and said nacelle with said end plate being disposed to be spaced substantially parallel to said nacelle whereby to produce a gap between said end plate and said nacelle.

* * * * *